United States Patent [19]
Mitchell et al.

[11] Patent Number: 5,802,313
[45] Date of Patent: Sep. 1, 1998

[54] EXTENDED DLUR/APPN SUPPORT FOR NON-APPN SNA DEVICES

[75] Inventors: John Orville Mitchell, Raleigh; Suvas Manubhai Shah, Cary, both of N.C.; John Hoon Shin, Austin, Tex.; Gary Michael Weichinger, Apex, N.C.

[73] Assignee: International Business Machines Corporation, Armonk, N.Y.

[21] Appl. No.: 702,392

[22] Filed: Aug. 14, 1996

[51] Int. Cl.[6] ............................................. G06F 13/00
[52] U.S. Cl. ........................ 395/200.68; 395/200.79; 395/200.3; 395/800.01
[58] Field of Search ..................... 395/200.79, 200.8, 395/800.01, 200.3, 200.68

[56] References Cited

U.S. PATENT DOCUMENTS 5,586,261  12/1996  Brooks et al. ................... 395/200.02

*Primary Examiner*—Eric Coleman
*Assistant Examiner*—Mackly Monestime
*Attorney, Agent, or Firm*—Jeanine S. Ray-Yarletts

[57] ABSTRACT

A system and method for connecting subarea SNA (systems network architecture) peripheral nodes into an APPN (Advanced Peer-to-Peer Network) network such that the peripheral nodes can function in the APPN network without upgrades to their existing software. This method also also enhances the manageability of the peripheral nodes by allowing the representation of the PU (physical unit) to reside in the peripheral node.

3 Claims, 5 Drawing Sheets

EXTENDED DLUR/APPN SUPPORT FOR NON-APPN SNA DEVICES

BACKGROUND OF THE INVENTION

The present invention relates to computer communications systems, particularly to SNA (Systems Network Architecture) communications systems. SNA is a seven-layer communications architecture which was developed by International Business Machines Corp. (IBM). It allows reliable transmission of data between a host computer (known as the primary computer) and one or more other computers (known as the secondary computers). SNA allowed many remote computers to connect to a host computer and communicate effectively using LU-LU (logical unit to logical unit) sessions and PU-PU (physical unit to physical unit) sessions. As the "secondary" computers became more powerful and numerous and the client-server environment evolved, the network became flooded with information being transmitted between the primary host and the secondary computers. The host became overburdened with managing the links to each of the secondary computers. In addition, with the power available in the secondary machines continuously increasing, a need arose to allow multiple machines to take a 'primary' role.

APPN (Advanced Peer-to-Peer Networking) filled that need. It allows multiple computers to act as peers in communicating and directing information across the network. APPN defines two basic node types: End Nodes (EN), which are capable of sending and receiving messages; and Network Nodes (NN), which have intermediate routing functions in addition to being able to send and receive messages. This was a significant enhancement to base SNA (which has become known as sub-area SNA). With traditional subarea SNA, the resources in a domain of subarea SNA networks are controlled through a hierarchical structure. The nodes that play a role in these networks are categorized as subarea and peripheral nodes. Attached to the subarea nodes, or border nodes, are peripheral nodes. With the introduction of APPN, a composite network node (which is usually a subarea network consisting of one instance of IBM's VTAM (Virtual Telecommunications Access Method) and one or more IBM NCPs (Network Communications Programs)) is able to present an APPN image to other APPN nodes. This allows subarea capable nodes to have APPN connectivity.

An additional node type, called an interchange node (ICN) can be a stand-alone APPN node or a composite network node. The ICN routes sessions from APPN nodes into and through the subarea network using subarea routing, without exposing the subarea implementation to the APPN part of the network. This is accomplished by making the APPN node, plus all its owned resources, appear to other nodes as a single APPN network node with multiple connections. At the same time the ICN, and the NCPs it owns, will maintain their subarea appearance to other subarea nodes.

An additional need, to connect SNA networks without interruption evolved. This requirement was partially addressed by the introducing of gateways. A detailed description of gateways can be found in U.S. Pat. No. 4,677,588, "Network Interconnection without Integration".

For additional information and background on APPN see IBM's "APPN Architecture and Product Implementations Tutorial", order number GG24-3669.

SUMMARY OF THE INVENTION

The requirement to connect old technology SNA devices or peripheral nodes into APPN networks has continued to evolve. Currently, non-APPN devices such as T2.0 devices (for example PC/3270, 4702, ATMS and 3274s) are not able to actively participate in an APPN network. A significant number of these non-APPN devices exist in networks currently implemented in industry. The inability of these devices to be supported directly by APPN hinders the industry from upgrading their networks due to the prohibitive cost of replacing all of the older network devices. APPN allows certain dependent LU types (LU 0, 1, 2 and 3) to participate in an APPN network using DLUR (Dependent LU Requestor), but this requires those devices to have APPN end node (EN) support implemented, which is not feasible in some of the devices such as 3274s and ATMs.

The present invention allows the extension of the SNA gateway for DLUR upstream, but continues to allow downstream devices to be attached via non-APPN means. This results in the SNA gateway providing the conversion from the non-APPN SNA devices (peripheral nodes) to DLUR/APPN upstream; therefore, the non-APPN SNA devices are able to participate in APPN networks without any changes.

DETAILED DESCRIPTION OF THE PREFERRED EMBODIMENT

Figure 1:
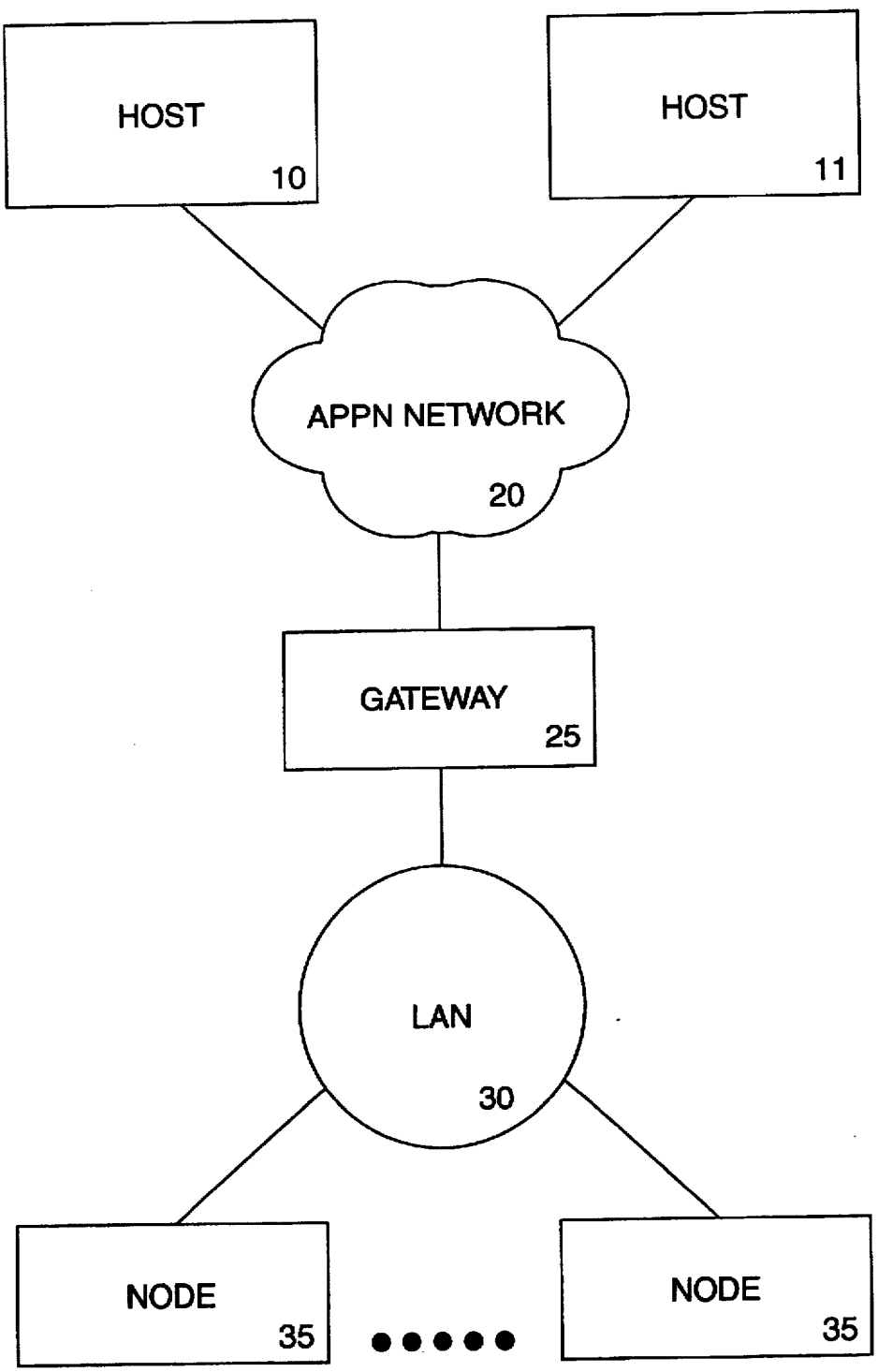
FIG. 1 is a diagram of a sample SNA network in which the present invention can be implemented (Prior Art).

The present invention comprises the combination of DLUR and gateway functions to support SNA peripheral nodes effectively across an APPN network. Functions such as gateway and DLUS/DLUR (Dependent LU Server/Dependent LU Requester) have been introduced to further enhance the APPN communications environment. DLUR allows a dependent LU to connect into an APPN network. It allows the dependent LU to reside on a node that is non-adjacent to the NCP (Network Control Program) in addition to allowing the APPN search logic to provide the best path for LU-LU sessions. The DLUR methodology is an encapsulation methodology in which the information that was, under subarea SNA, sent between the SSCP-LU (System Services Control Point to Logical Unit) and SSCP-PU (System Services Control Point to Physical Unit) sessions is encapsulated and sent between the DLUS and the DLUR. The DLUR would then unencapsulated the information and transmit it to the subarea or peripheral node. It appeared to the APPN network that the DLUR owned the peripheral node.

The introduction of gateways also provided significant benefit. The SNA gateway, in respect to the current application, allowed the peripheral nodes to connect to the gateway node and have their LUs be recognized through the gateway. This allowed a subarea network to access multiple end stations with simplified configuration; thereby attaching to an APPN network. It provided knowledge of the peripheral LUs into the APPN network and provided an SSCP-LU session to the peripheral node.

Initially the gateway was required to be adjacent to the NCP to provide the connection to the peripheral nodes. The introduction of DLUR/DLUS now allows the gateway to be one or more levels removed from the NCP. The sessions to the host from the gateway nodes can be routed through the APPN network and take advantage of the alternate routes that might be available through APPN.

APPN gateway is capable of supporting HPR (High Performance Routing) which will enable the sessions to be non-disruptively rerouted to the same host. This provides non-disruptive session capability for the workstations from the gateway through the APPN network. The gateway with DLUR can also act as a PU pooler. DLUR enables an unlimited number of PUs to share the same physical link, therefore the gateway can pass the PU flows between a host and a defined workstation. This downstream PU visibility feature then makes the gateway logically transparent to the workstation while providing the workstation with APPN access without change, thereby allowing the benefits of HPR to also be realized. This will become apparent from the figures below.

In addition, gateways allow workstations to share a physical link with the host, reducing host resources and definitions. The gateway also provides backup capability for all of the workstations. The gateway can also provide multiple PU access to workstations that support only a single PU.

The present invention involves the combination of the DLUR function and the gateway function to support native subarea SNA devices (peripheral nodes) in an APPN network; in addition, allowing more specific manageability of the network. It will be described in further detail with respect to the figures. This description is by way of example and is not meant to limit or restrict the claims of the invention in any way. Like numbers are used on sequential figures to indicate the same item.

FIG. 1 depicts a diagram of an SNA network in which the present invention can be implemented. One or more hosts 10,11 are connected to an APPN network 20. These hosts 10,11 communicate through the APPN network 20 to subarea SNA nodes 35. In the present example, the APPN network is connected to a gateway 25 which provides translation from APPN to subarea SNA for traffic flowing through it. The gateway 25 is connected to a LAN 30 (or alternatively to another transportation medium), which in turn is connected to one or more nodes 35. The gateway allows traffic to flow from the APPN hosts 10,11 to the one or more subarea nodes 35. Further detail of this network is shown in FIG. 2.

Figure 2:
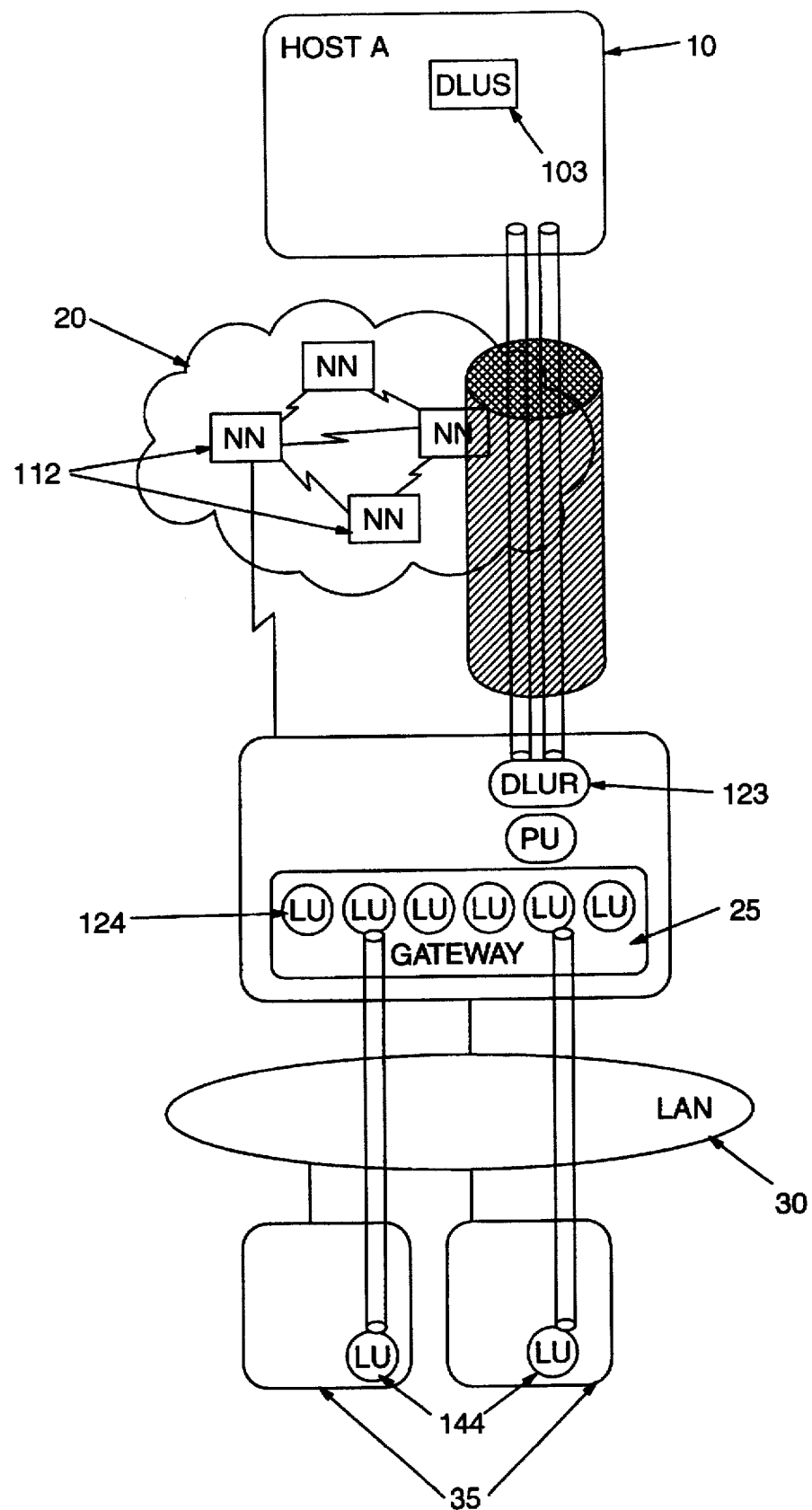
FIG. 2 depicts the implementation of the DLUR function in the SNA gateway.

FIG. 2 demonstrates the use of DLUR in a gateway. The host 10 is connected to the APPN network 20. The APPN network contains multiple network nodes 112 and is connected to the gateway 25. The DLUS function 103 running in the host 10 communicates with the DLUR function 123 running at the gateway 25 to provide an APPN pipe from the host 10 to the gateway 25. This enables LUs 124 in the gateway 25 to communicate directly to the LUs 144 in the subarea SNA nodes 35 over a communications medium such as a LAN 30. The DLUR support for the gateway 25 enables the subarea nodes 35 to participate in the APPN routing through the APPN network 20. The gateway 25 creates a simulated SSCP-PU (System Services Control Point to PU) session between the gateway 25 and the peripheral node 35. Information for the subarea nodes 35 is sent from the host 10 to the gateway 25. The DLUR support 123 residing in the gateway 25 establishes a session with the DLUS support 103 residing in the host 10 to provide direct communication between the host 10 and the gateway 25. The DLUR support 123 translates the destination address for information sent from the host from an APPN address to a subarea SNA address. It then delivers that information to an LU 124 residing in the gateway which has a session with the LU 144 residing in the subarea SNA device.

Figure 3:
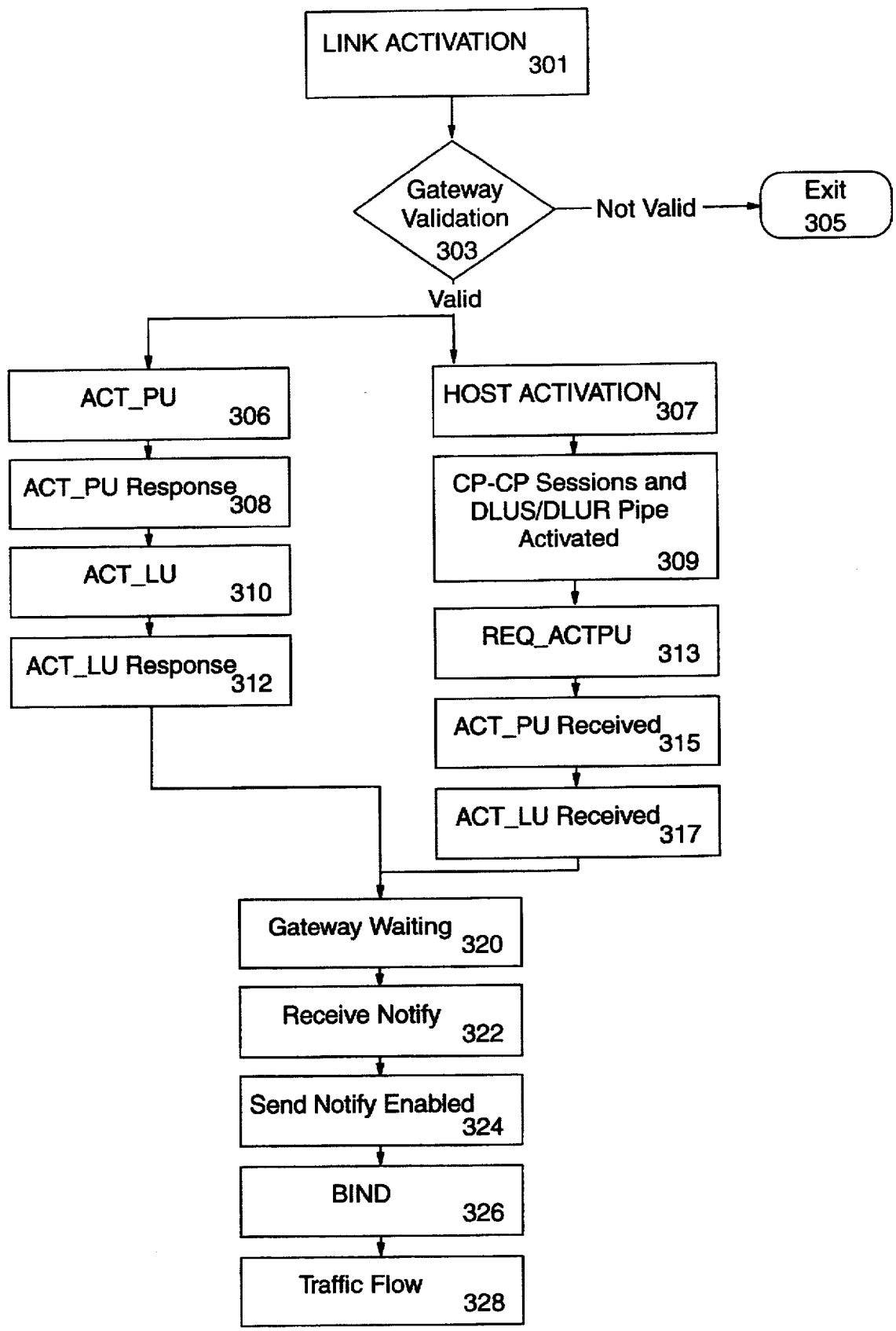
FIG. 3 is a flowchart of the transformation of information required for communication between the APPN network and the subarea SNA device attached through the gateway.

FIG. 3 denotes the logic for the activation of the DLUR gateway. At 301, the gateway link is activated by the peripheral node sending a link activation request to the gateway. The gateway validates the request 303 and if it is not a valid request, the process terminates 305. If the request is valid, the gateway initiates activation of the host 307 while concurrently initializing the peripheral node. For the host activation, the physical connection to the APPN cloud is established by the DLUR/DLUS pipe being activated 309. This allows CP Service Manager sessions (CPSVRMGR) to be established. Next encapsulated information is sent from the gateway to the host. First an encapsulated request to activate the PU is sent 313. Next an encapsulated acknowledgement of the activate PU is received 315. Then multiple encapsulated requests to activate each LU are received 317 and the gateway goes into a waiting mode 320.

Concurrently, the gateway sends a request to activate the PU to the peripheral node 306 and receives a response 308 from that peripheral node acknowledging that the PU has been activated. Next the gateway sends requests 310 to activate each of the LUs to the peripheral node and responses are received 312. Then the gateway goes into a waiting mode 320.

Once notification is received that the peripheral node is online (or active) 322, the gateway sends an encapsulated 'notify enabled' 324 to the host. The gateway then receives, from the host, the BIND 326. This BIND is transmitted through the APPN network and forwarded to the peripheral nodes. The normal flow of traffic 328 through the network then proceeds.

Figure 4:
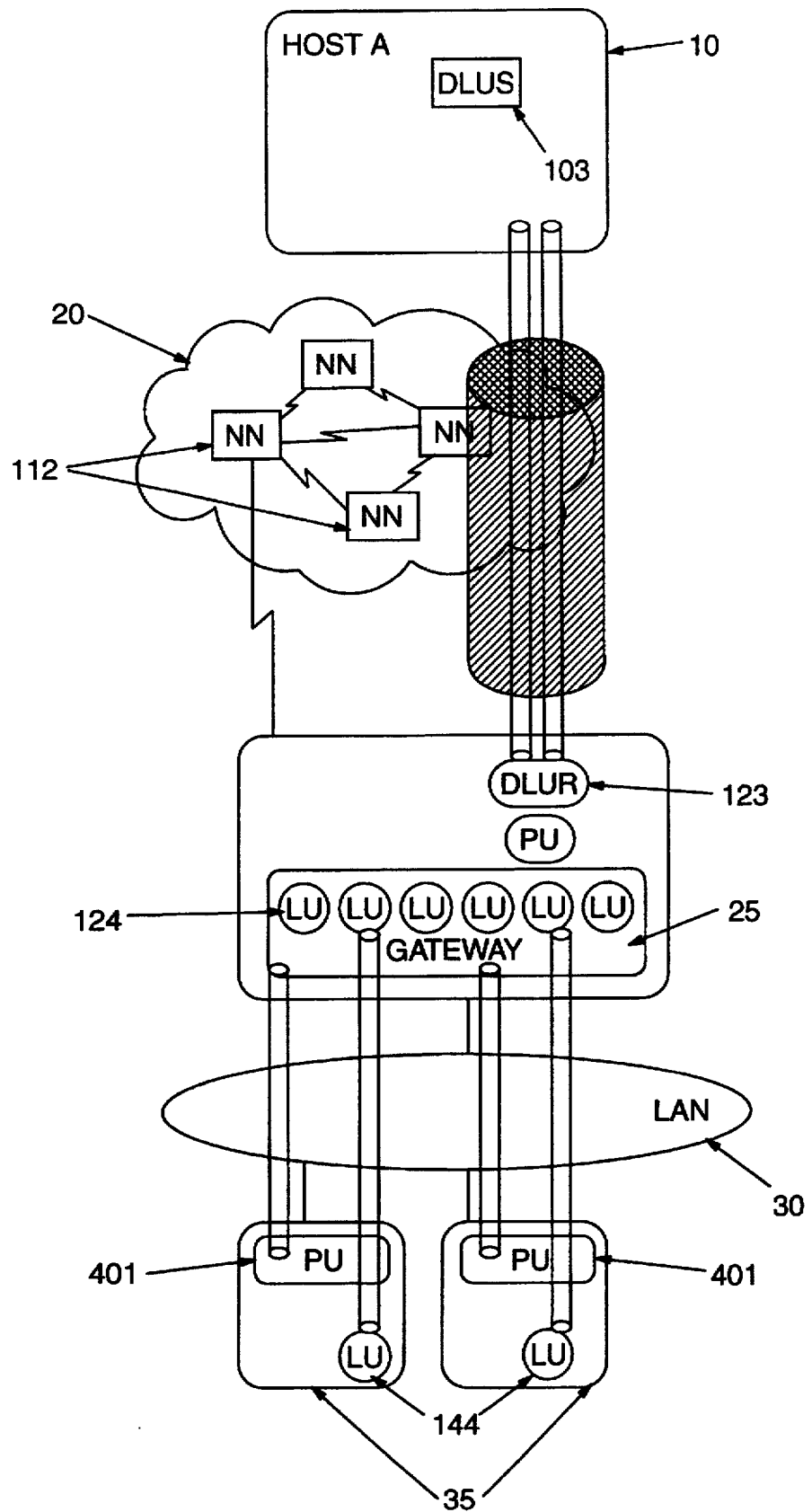
FIG. 4 demonstrates the movement of the PU into the peripheral node.

FIG. 4 depicts an additional function of the present invention. The incorporation of the DLUS/DLUR function into the gateway allows PU pooling. This allows the image of the PU to be pushed down into the peripheral node 401. This means that the gateway is no longer required to appear as the PU for the peripheral node; the peripheral node can appear as the PU. The movement of the PU image into the peripheral node allows for network management facilities to identify the status and execute queries against each of the otherwise "dumb" devices. This is extremely important in applications such as the banking industry and ATMs where a system administrator would want to run queries on each of the remote ATMs, not just on an aggregate of ATMs.

Figure 5:
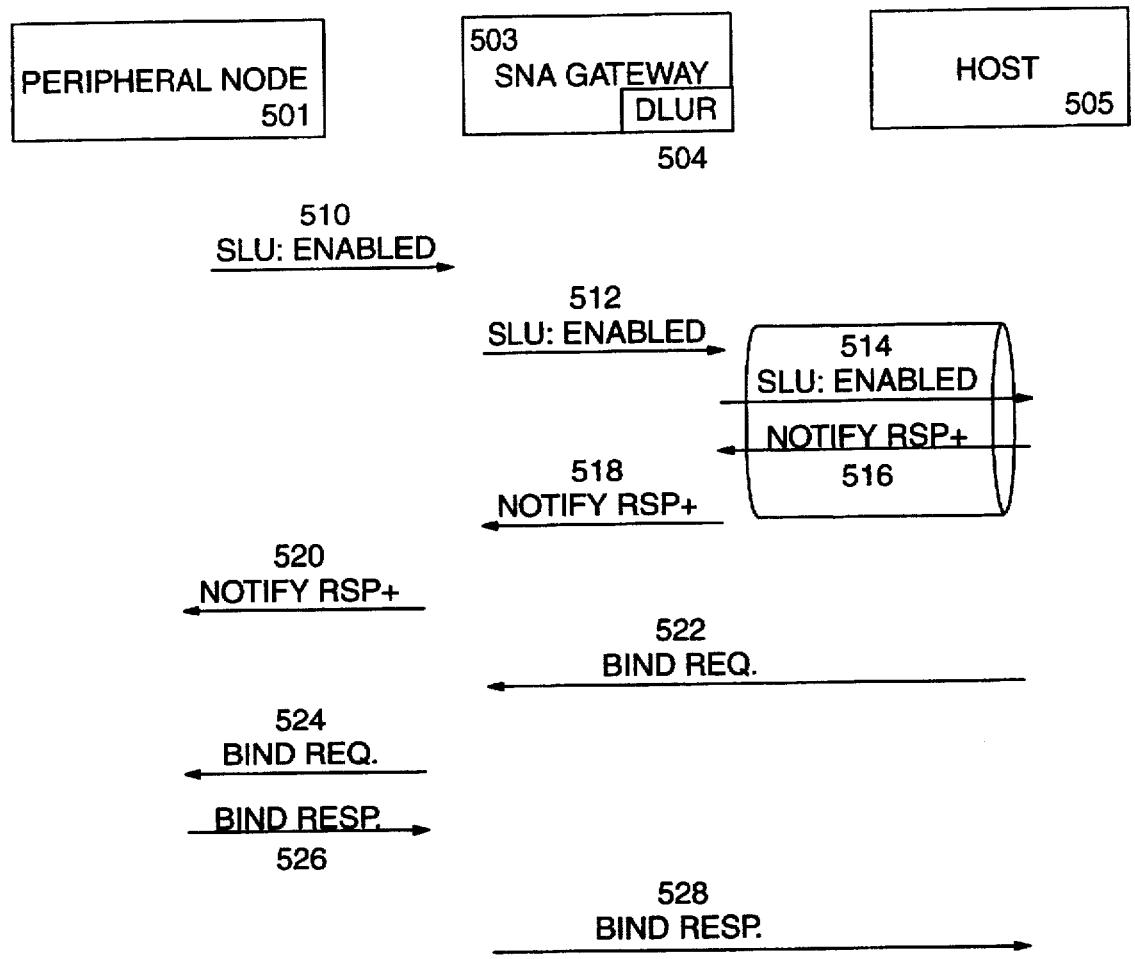
FIG. 5 further depicts the flow between the peripheral node and the host of the present invention.

FIG. 5 is a further representation of the flows which transpire between the peripheral node and the host using the SNA gateway of the present invention. The peripheral node 501 sends a 'notify' request 510 to the gateway 503 where the DLUR 504 is located. The 'notify' request 510 contains information indicating that the peripheral node is active (SLU: enabled). The 'notify' request is routed to the DLUR in the gateway 512 and encapsulated by the DLUR. The encapsulated 'notify' 514 is sent over the DLUS/DLUR session to the host 505. The host 505 then sends back an encapsulated 'notify' response 516 which the DLUR 504 unencapulates 518 and sends onward 520 to the peripheral node 501. Next an LU-LU session is established between the host and the peripheral node. A BIND request 522 is sent from the host 505 to the gateway 503. The gateway transforms the address to one recognizable by the peripheral node and passes the BIND request 524 on to the peripheral node 501. The peripheral node 501 responds to the BIND request 526 and transmits the response to the gateway, which again translates the address and forwards the response 528 on to the host.

While the invention has been particularly shown and described with reference to a preferred embodiment, it should be understood by those skilled in the art that various changes in form and detail may be made therein without departing from the spirit and scope of the invention.

What we claim is new and desire to secure by Letters Patent is:

1. A computer telecommunications network system having at least one APPN host in at least one APPN network connecting to at least one sub-area SNA peripheral node through an SNA gateway, said telecommunications network comprising:

means for connecting said at least one sub-area SNA peripheral node through said SNA gateway using APPN DLUR;

means at said gateway for translating an address representing said peripheral node between an APPN address and a subarea address such that said peripheral node can receive first information from said APPN network; and means at said host for receiving second information from the gateway using DLUS.

2. A method for attaching one or more unmodified sub-area SNA peripheral nodes to one or more APPN networks by way of an SNA gateway, said method comprising the steps of:

defining a DLUS node in a host computer connected to one of said APPN networks;

defining a DLUR node in the SNA gateway;

establishing a DLUS/DLUR session between said host computer connected to one of said APPN networks and said SNA gateway;

establishing an SSCP_LU session between the gateway and one of said peripheral nodes; and transforming information transmitted from the sub-area SNA peripheral node to the APPN network by translating address information in the information being transmitted.

3. The method as in claim 2 further comprising the step of:

establishing an SSCP_PU session between the gateway and the peripheral node.

* * * * *